United States Patent [19]

Corsi et al.

[11] Patent Number: 4,907,767
[45] Date of Patent: Mar. 13, 1990

[54] STACKABLE MODULAR DUCT ASSEMBLIES

[75] Inventors: Paul J. Corsi, Terryville; Richard H. Russell, Farmington, both of Conn.

[73] Assignee: Hubbell Incorporated, Orange, Conn.

[21] Appl. No.: 231,521

[22] Filed: Aug. 12, 1988

[51] Int. Cl.$^4$ ............................................. H02G 3/04
[52] U.S. Cl. ........................................ 248/49; 174/97; 174/101; 138/92; 138/162
[58] Field of Search ............ 248/558, 49, 68.1; 174/101, 97; 52/221, 730, 588; 138/92, 162, 163, 157, 156, 167, 168, 115; 285/921, 137.1

[56] References Cited

U.S. PATENT DOCUMENTS

| | | | |
|---|---|---|---|
| 3,693,664 | 9/1972 | Schmunk | 138/111 |
| 3,727,644 | 4/1973 | Kagan | 138/155 |
| 3,769,445 | 10/1973 | Bregenzer | 174/97 |
| 3,927,698 | 12/1975 | Johannsen | 138/162 |
| 4,136,257 | 1/1979 | Taylor | 248/68.1 |
| 4,286,630 | 9/1981 | Happer | 138/92 |
| 4,347,998 | 9/1982 | Loree | 174/97 |
| 4,391,426 | 7/1983 | Gothberg | 248/49 |
| 4,423,284 | 12/1983 | Kaplan | 174/101 |
| 4,589,449 | 5/1986 | Bramwell | 138/92 |
| 4,602,124 | 7/1986 | Santucci | 138/157 |
| 4,627,469 | 12/1986 | Buard | 138/92 |
| 4,627,679 | 12/1986 | Billette de Villemeur et al. | 174/101 |
| 4,640,314 | 2/1987 | Mock | 138/162 |
| 4,720,768 | 1/1988 | Schindele | 361/334 |

FOREIGN PATENT DOCUMENTS

| | | | |
|---|---|---|---|
| 246826 | 5/1966 | Austria | 174/97 |
| 1236621 | 3/1967 | Fed. Rep. of Germany | 138/92 |
| 2153394 | 5/1973 | Fed. Rep. of Germany | 52/588 |
| 2303593 | 10/1973 | Fed. Rep. of Germany | 174/97 |
| 3335884 | 10/1983 | Fed. Rep. of Germany | 174/101 |
| 2406327 | 6/1979 | France | 138/162 |
| 443432 | 2/1968 | Switzerland | 174/101 |
| 561969 | 5/1975 | Switzerland | 174/101 |
| 1021871 | 3/1966 | United Kingdom | 174/101 |
| 1048227 | 11/1966 | United Kingdom | 248/68.1 |

*Primary Examiner*—Ramon O. Ramirez
*Assistant Examiner*—Robert A. Olson
*Attorney, Agent, or Firm*—Jerry M. Presson; Alfred N. Goodman

[57] ABSTRACT

A duct assembly for enclosing conduits therein comprising a base and a pair of opposing side walls extending substantially perpendicular thereto, and a cover having an intermediate portion with a pair of generally parallel end portions extending substantially perpendicular thereto. The side walls of the base each have a tapered rib extending outwardly therefrom for engaging a U-shaped groove in the end portions of the cover to snap-fit the cover to the base. The ribs and grooves cooperate to provide first and second coupled positions. When the duct assembly is in its first position, a recess is formed for inserting a coupling member therein to join a substantially identical duct assembly thereto in a side by side relation. When the duct assembly is in its second position, the ribs and grooves are secured together to provide a smooth outer surface between the cover and the base. The bottom of each base can be snap fitted to the top of an identical base.

18 Claims, 3 Drawing Sheets

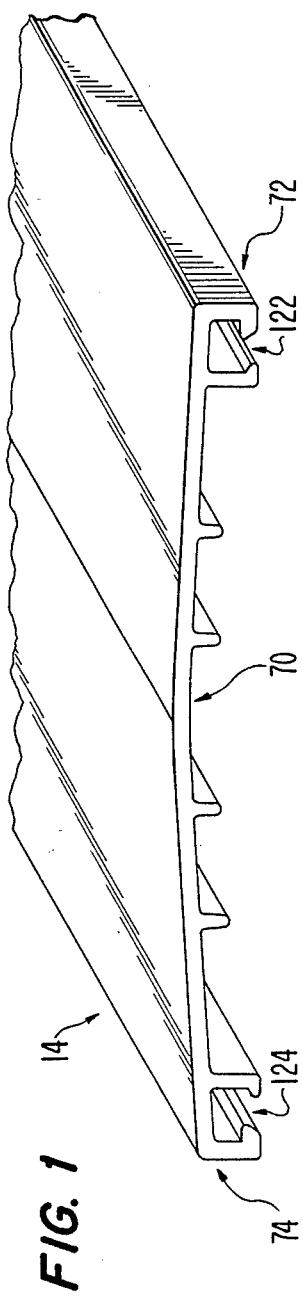
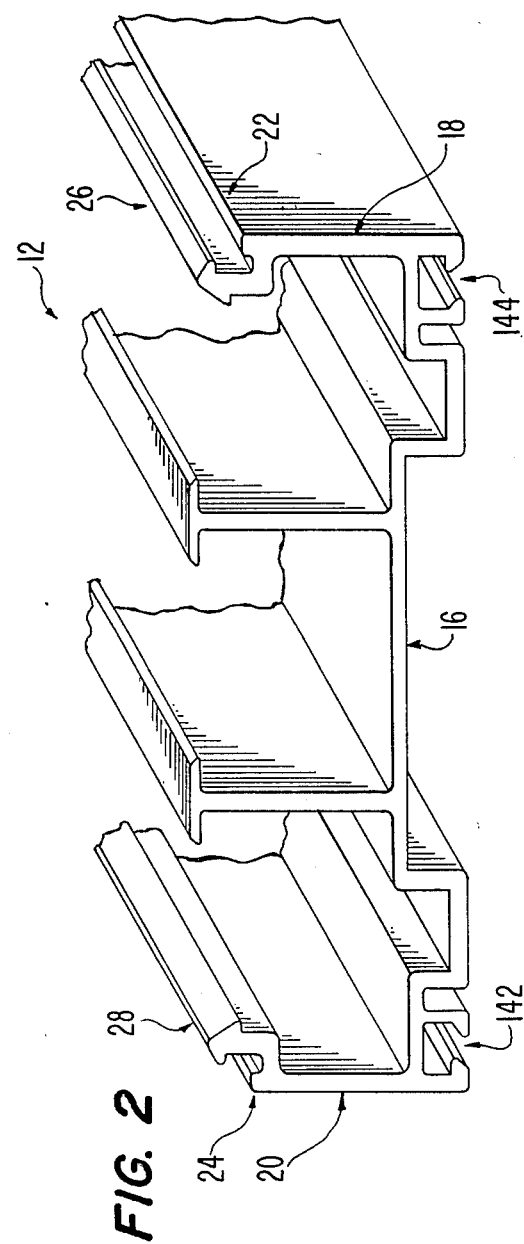

STACKABLE MODULAR DUCT ASSEMBLIES

FIELD OF THE INVENTION

The invention relates to duct assemblies for enclosing conduits, cables, wires, lines and the like therein. More specifically, the invention relates to stackable modular duct assemblies which are formed by identical covers and bases and can be stacked side by side, with additional bases being attachable to a preceding base. When a cover is selectively coupled to a base in a first position, a recess is formed for receiving a coupling member for coupling a substantially identical duct assembly thereto in the side by side configuration. However, when the cover is coupled to the base in its second position, a smooth outer surface is formed.

BACKGROUND OF THE INVENTION

Numerous duct assemblies are known in the prior art for enclosing conduits. However, these duct assemblies have several disadvantages. For example, many of them require many additional pieces to join a plurality of duct assemblies together. In addition, many of these prior art devices do not provide any means for attaching another duct assembly thereto in both the X and Y directions, i.e., side by side or one on top of the other. Moreover, many of these prior art duct assemblies are very expensive to make because they require numerous parts.

Examples of these prior art devices are disclosed in U.S. Pat. Nos. 3,693,664 to Schmunk; 3,727,644 to Kagan; 3,927,698 to Johannsen; 4,391,426 to Gothberg; 4,640,314 to Mock; 4,627,469 to Buard; and 4,720,768 to Schindele.

SUMMARY OF THE INVENTION

Accordingly, a primary object of the invention is to provide a duct assembly that can be easily coupled to another duct assembly in both the X and Y directions.

Another object of the invention is to provide a duct assembly that is inexpensive to manufacture.

Another object of the invention is to provide a duct assembly that provides a smooth outer surface when either connected to another duct assembly or when used by itself.

The foregoing objects are basically attained by providing a duct assembly for enclosing conduits therein, the combination comprising: a base, having a generally uniform cross section along its longitudinal axis, including a central portion and a pair of opposed side walls extending substantially perpendicular to said central portion; a cover, having a generally uniform cross section along its longitudinal axis, including an intermediate portion and a pair of generally parallel end portions extending substantially perpendicular to said intermediate portion; and coupling members attached to the side walls and the end portions for releasably coupling the cover to he base; the coupling members for releasably coupling including complementary coupling members on the side walls and the end portions for selectively coupling the base and the cover in first and second positions.

Other objects, advantages and salient features of the invention will become apparent from the following detailed description, which, taken in conjunction with the annexed drawings, discloses the preferred embodiment of the invention.

BRIEF DESCRIPTION OF THE DRAWINGS

Referring now to the drawings which form part of this original disclosure,

FIG. 1 is a fragmentary right perspective view of the cover of the duct assembly in accordance with the present invention;

FIG. 2 is a fragmentary right perspective view of the base of the duct assembly in accordance with the present invention;

DETAILED DESCRIPTION OF THE INVENTION

Figure 4:
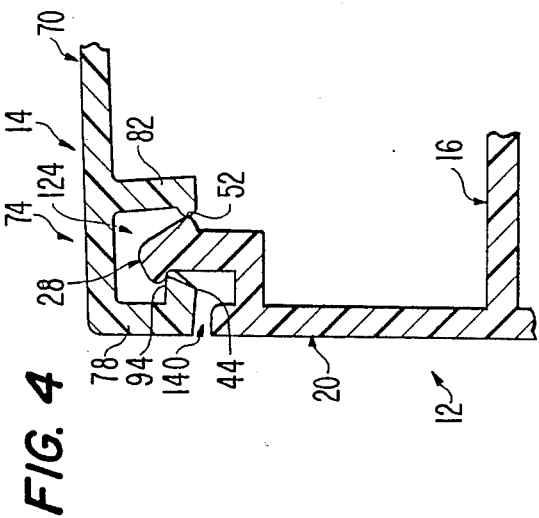
FIG. 4 is an enlarged, fragmentary, transverse cross-sectional elevational view of an end portion and a side wall coupled together in their first position.
Figure 5:
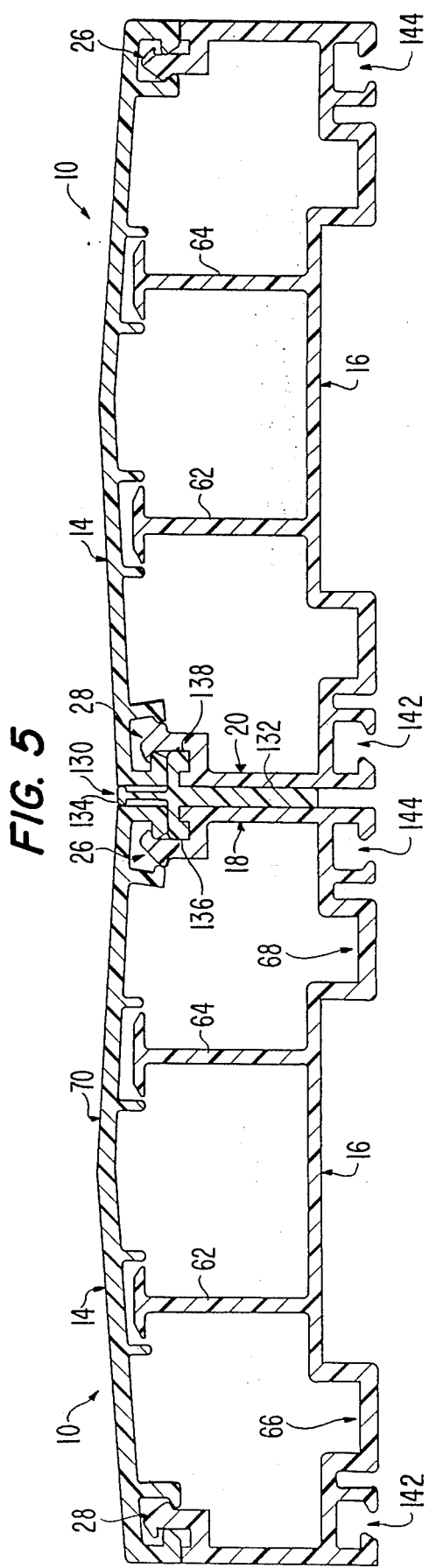
FIG. 5 is a transverse cross-sectional elevational view of a pair of duct assemblies coupled together in accordance with the present invention.
Figure 7:
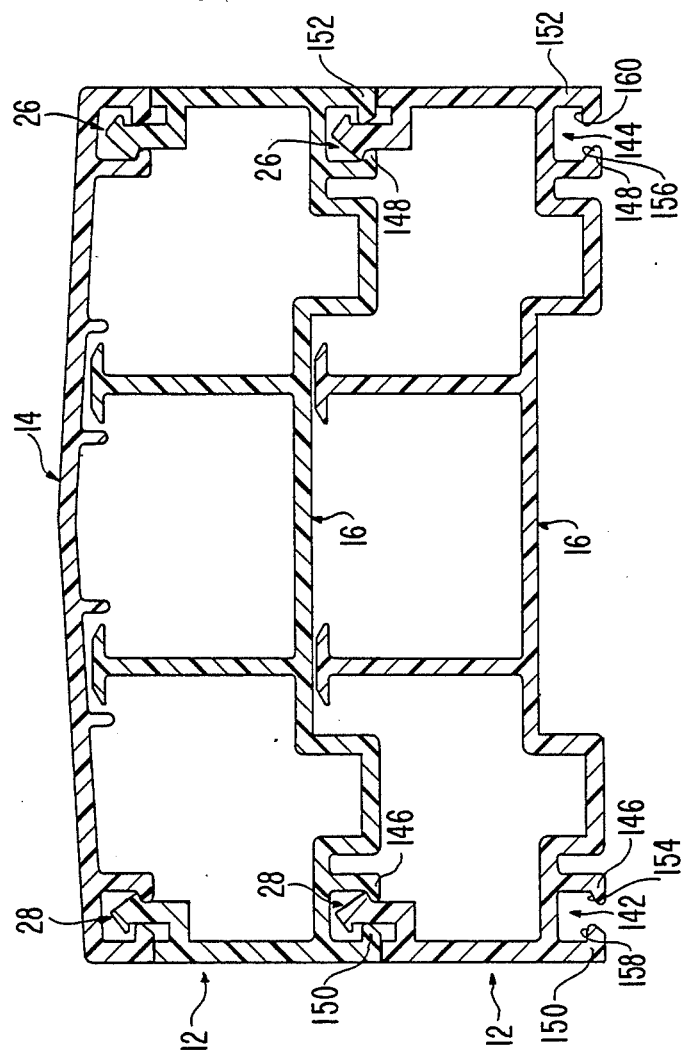
FIG. 7 is a transverse cross-sectional elevational view of a duct assembly having an additional base connected thereto.

As seen in FIGS. 1-5, the duct assembly 10 in accordance with the present invention comprises a base 12 having a uniform cross section along its longitudinal axis and a cover 14 having a uniform cross section along its longitudinal axis. Both the base 12 and the cover 14 are preferably formed by extrusion of a resilient polymeric material and can be snapped together to form the duct assembly 10 as seen in FIGS. 5 and 7.

The base 12 includes a central portion 16 and a pair of opposed side walls 18 and 20 extending substantially perpendicular to the central portion. The side walls 18 and 20 are generally planar and parallel to one another and each have a free end 22 and 24 with an elongated rib 26 and 28 coupled thereto, respectively. Each rib has a substantially arrowhead shaped cross section with transversely and axially spaced downwardly facing coupling surfaces 42, 44 and 50, 52, respectively, thereon. Coupling surfaces 42 and 44 are closer to the distal ends of the ribs than coupling surfaces 54 and 56.

Figure 3:
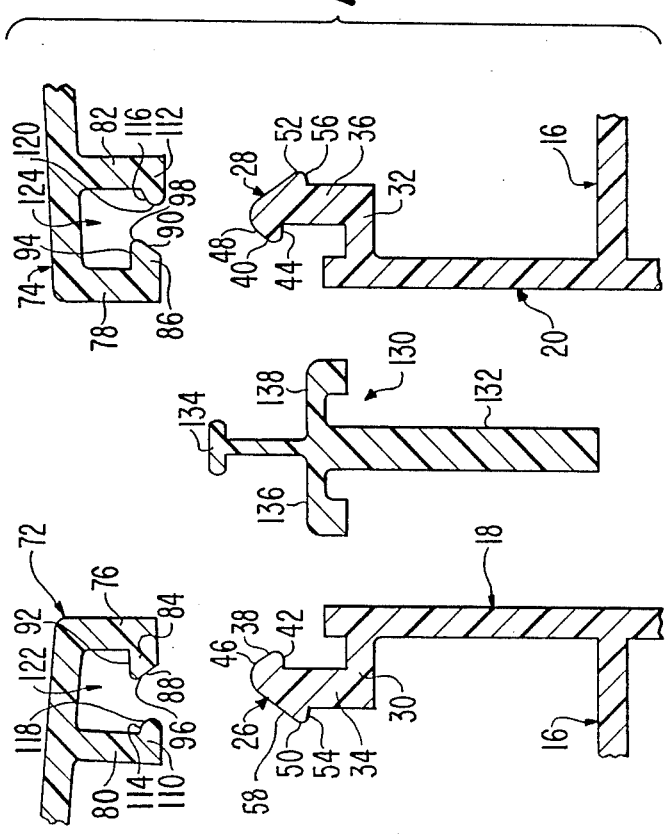
FIG. 3 is an enlarged, fragmentary, transverse cross-sectional elevational view of the side walls and end portions of two adjacent duct assemblies with a coupling member positioned therebetween in accordance with the present invention.

As seen in FIG. 3, the ribs 26 and 28 each includes a planar ledge 30 and 32, respectively, extending inwardly and perpendicular to their respective side wall and towards the opposed side wall. The ribs 26 and 28 each further includes a leg 34 and 36, respectively, extending substantially perpendicular from their respective ledge and away from the central portion 16. The legs 34 and 36 each includes an outwardly projecting abutment 38 and 40, respectively. The outwardly projecting abutments 38 and 40 are each provided with a downwardly facing planar coupling surface 42 and 44 and upwardly and inwardly sloping surfaces 46 and 48, respectively. These planar coupling surfaces 42 and 44 are oriented at an angle of about 90° from their respective leg. The sloping surfaces 46 and 48 are oriented inwardly at an angle of about 40° from their respective coupling surface and serve as ramps to coupling surfaces 42 and 44, respectively.

The legs 34 and 36 are each further provided with an inwardly projecting abutment 50 and 52, respectively. The inwardly projecting abutments 50 and 52 are each provided with a downwardly facing, upwardly and inwardly tapering planar coupling surface 54 and 56, and upwardly and outwardly sloping surfaces 58 and 60, respectively. The planar coupling surfaces 54 and 56 are oriented at an angle of about 105° from their respective leg. The sloping surfaces 58 and 60 are oriented outwardly at an angle of about 35° from their respective leg and serve as ramps to coupling surfaces 54 and 56. The coupling surfaces 42 and 44 and the coupling surfaces 54 and 56 are spaced relative to one another, respectively, along their respective leg, with surfaces 54 and 56 being lower by, for example, 0.075 inch.

As seen in FIG. 5, the central portion 16 of the base 12 may optionally have a pair of partitions 62 and 64 extending substantially perpendicular thereto. The partitions 62 and 64 are preferably T-shaped and integrally formed with the base. The central portion 16 is also provided with a pair of mounting recesses 66 and 68 for receiving a fastener, such as nails or screws, to mount the base 12 to a wall (not shown).

The cover 14, as seen in FIG. 1, includes an intermediate portion 70 and a pair of generally parallel end portions 72 and 74 extending substantially perpendicular to the intermediate portion.

As seen in FIG. 3, the end portions 72 and 74 each are substantially U-shaped in cross section and include resilient outer legs 76 and 78 and resilient inner legs 80 and 82, respectively. The legs 76, 78, 80 and 82, extend substantially perpendicular to the intermediate portion 70 and are integrally formed therewith. The outer legs 76 and 78 are each provided with an inwardly projecting flange 84 and 86 at their free ends, respectively. These inwardly projecting flanges 84 and 86 each have an inwardly and upwardly sloping surface 88 and 90, and an upwardly facing planar coupling surface 92 and 94, respectively. The sloping surfaces 88 and 90 are oriented inwardly at an angle of about 45° from their respective free end of the outer leg. The planar coupling surfaces 92 and 94 are oriented inwardly at an angle of about 90° from their respective outer leg, face towards the intermediate portion 70, and are connected to the respective sloping surface 88 and 90 by a curvilinear surface 96 and 98, respectively. These sloping surfaces 88 and 90 and the curvilinear surfaces 96 and 98 serve as ramps for coupling surfaces 92 and 94.

The inner legs 80 and 82 each includes an outwardly projecting flange 110 and 112 at their free ends which extends towards their respective inwardly projecting flanges 84 and 86. The outwardly projecting flanges 110 and 112 are each provided with an upwardly facing, inwardly and upwardly tapering planar coupling surface 114 and 116, respectively. These planar coupling surfaces 114 and 116 are oriented outwardly at an angle of about 105° from their respective inner leg. The coupling surfaces 114 and 116 face towards the intermediate portion 70. The outwardly projecting flanges 110 and 112 each further includes a curvilinear surface 118 and 120 which leads to the free end of the inner leg. These curvilinear surfaces 118 and 120 serve as ramps for coupling surfaces 114 and 116.

The coupling surfaces 92 and 94 and the coupling surfaces 114 and 116 are spaced relative to one another, respectively, away from the intermediate portion 70. Together, the inner and outer legs form a pair of coupling grooves or sockets 122 and 124 with transversely and axially spaced upwardly facing coupling surfaces 92, 94 and 114, 116 thereon. Coupling surfaces 92 and 94 are closer to the intermediate portion 70 than coupling surfaces 114 and 116 by, for example, 0.030 inch.

The relaxed width of sockets 122 and 124 between surfaces 96 and 118 and 98 and 120 is less than the width of the ribs 26 and 28 between abutments 38 and 50 and 40 and 52 to provide a snap fit therebetween.

A coupling member 130, as seen in FIG. 3, has a generally uniform cross section along its length and is employed to couple a pair of substantially identical duct assemblies 10 together. The coupling member 130 has a generally cross-shaped cross section. The coupling member includes a straight main body spacer 132, a T-shaped cover spacer 134, and a pair of L-shaped legs 136 and 138 extending substantially perpendicular to the main body spacer 132 and the cover spacer 134 for coupling a pair of duct assemblies 10 together, as seen in FIG. 5.

Referring now to FIG. 4, the cover 14 can be releasably coupled or snap-fitted to the base 12 by partial or initial insertion of ribs 26 and 28 into sockets 122 and 124. After this initial insertion, which biases the resilient legs apart, the end portion 74 on the cover and side wall 20 on the base form an L-shaped recess 140 for receiving the L-shaped leg 138 of the coupling member 130. As seen in FIGS. 4 and 5, when the cover 14 is snapped into place in this first or initial position, the inner leg 82 is slightly deformed by the inwardly projecting abutment 52 on rib 28 and the outer leg 78 defining socket 124 has its coupling surface 94 engaging the coupling surface 44 of the outwardly projecting abutment 40 on rib 28.

As seen in FIG. 5, when two ducts 10 are coupled together side by side, legs 136 and 138 on the coupling member 130 are received in the recesses between the covers and bases, main body spacer 132 engages adjacent side walls 18 and 20 of adjacent bases 16, and cover spacer 134 engages adjacent end portions of adjacent covers 14.

Figure 6:
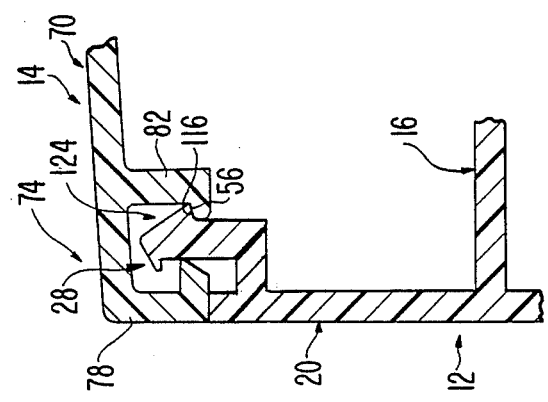
FIG. 6 is an enlarged, fragmentary, transverse cross-sectional elevational view of an end portion and side wall coupled together in their second position.

Referring now to FIG. 6, cover 14 has been snap-fitted into its second position so that the inner leg 82 has its coupling surface 116 engaging the coupling surface 56 of the inwardly projecting abutment 52 on rib 28. In this position, the side wall 20 and end portion 74 form a smooth outer surface of the duct assembly 10 as the side wall and outer leg 78 engage.

Referring to FIG. 7, the base 12 is provided with additional resilient, substantially U-shaped coupling grooves or sockets 142 and 144. These additional coupling grooves 142 and 144 are substantially identical to the coupling grooves 122 and 124 of the cover 14.

These additional coupling grooves 142 and 144 each includes an inner leg 146 and 148 and an outer leg 150 and 152, respectively. These inner legs 146 and 148 and outer legs 150 and 152 are substantially identical to the inner legs 76 and 78 and outer legs 80 and 82 of the cover 14. The inner legs 146 and 148 each includes a coupling surface 154 and 156, respectively. The outer legs 150 and 152 each includes a coupling surface 158 and 160.

Thus, a pair of bases 12 may be coupled together in fully inserted positions, as shown in FIG. 7 or in partially inserted positions similar to that shown in FIG. 4. Moreover, since the coupling grooves 142 and 144 are substantially identical to the coupling grooves 122 and 124 of the cover 14, the bases 12 can be coupled together in a stacked one on top of the other configuration and added if desired to the side by side ducts shown in FIG. 5.

While only one embodiment has been chosen to illustrate the invention, it will be understood by those skilled in the art that various changes and modifications can be made herein without departing from the scope of the invention as defined in the appended claims.

What is claimed is:

1. A duct assembly for enclosing conduits, the combination comprising:
   a base, having a generally uniform cross section along its longitudinal axis, including a central portion and a pair of opposed side walls extending substantially perpendicular to said central portion;
   a cover, having a generally uniform cross section along its longitudinal axis, including an intermediate portion and a pair of generally parallel end portions extending substantially perpendicular to said intermediate portion; and
   means, coupled to said side walls and said end portions, for releasably coupling said cover to said base,
   said means for releasable coupling including complementary coupling means of each of said side walls and said end portions for selectively coupling said base and said cover in first and second spaced, but coupled positions,
   each of said complementary coupling means comprising abutment means for resisting relative outward movement of said cover and said base by interlocking engagement when in said first coupled position, and for resisting relative outward movement of said cover and base by interlocking engagement when in said second coupled position,
   one of said side walls being coupled to one of said end portions and the other of said side walls being coupled to the other of said end portions for defining a recess between coupled side walls and end portions when in said first coupled position, and for forming a substantially continuous, smooth, outer surface between coupled and contiguous side walls and end portions when in said second coupled position.

2. A duct assembly according to claim 1, wherein said abutment means on each of said side walls and said end portions comprises a first pair of transversely spaced coupling surfaces and a second pair of transversely spaced coupling surfaces, said first and second pairs of transversely spaced coupling surfaces coacting to selectively coupled said cover to said base in either of said first and second coupled positions.

3. A duct assembly according to claim 1, wherein said abutment means on said side walls and said end portions comprises
   a pair of elongataed ribs, each of said ribs having a first pair of transversely spaced coupling surfaces thereon, and
   a pair of elongated sockets, each of said sockets having a second pair of transversely spaced coupling surfaces therein,
   said first pairs of coupling surfaces each being selectively engageable with a respective one of said second pairs of coupling surfaces for selectively coupling said cover to said base in either of said firs and second coupled positions.

4. A duct assembly according to claim 1, and further comprising
   a coupling member,
   each of said recesses adapted to receive said coupling member therein for coupling a substantially identical duct assembly thereto.

5. A duct assembly according to claim 1, wherein said central portion includes additional means for coupling a substantially identical base thereto.

6. A duct assembly according to claim 1, wherein said central portion includes at least one partition extending substantially perpendicular thereto.

7. A duct assembly according to claim 1, wherein said abutment means on said side walls and said end portions comprises a pair of elongated ribs and. a pair of elongated sockets.

8. A duct assembly according to claim 7, wherein said ribs are coupled to s aid side walls and said sockets are located in said end portions.

9. A modular duct assembly for enclosing conduits, the combination comprising:
   two bases, each having a generally uniform across section along its longitudinal axis, including a central portion and a pair of opposed side walls extending substantially perpendicular to said central portion;
   two covers, each having a generally uniform cross section along its longitudinal axis, including an intermediate portion and a pair of opposed end portions extending substantially perpendicular of said intermediate portion;
   means, coupled to each of said side walls and said end portions, for releasably coupling each of said covers to one of said bases, thereby forming first and second ducts; and
   a coupling member having a generally uniform cross section along its longitudinal axis for coupling said first and second ducts together in a side by side relationship,
   each of said means for releasably coupling including complementary coupling means on each of said side walls and said end portions for selectively coupling each of said bases and each of said covers in first and second spaced, but coupled, positions,
   each of said complementary coupling means comprising abutment means for resisting relative outward movement of each of said covers and each of said bases when in their said first coupled positions, and for resisting relative outward movement of each of said covers and each of said bases when in their said second coupled positions,
   one of said side walls of each of said bases being coupled to one of said end portions of each of said covers and the other of said side walls of each of said bases being coupled to the other of said end portions of each of said covers for defining a recess to releasably receive a part of said coupling member therein between coupled side walls and end portions when in their said first coupled positions, and for forming a substantially continuous, smooth, outer surface between coupled side walls and end portions when in their said second coupled positions.

10. A duct assembly according to claim 9, wherein said central portion of each of said bases has additional means for coupling a substantially identical base thereto.

11. A duct assembly according to claim 9, wherein said coupling member has a generally cross-shaped cross section.

12. A duct assembly according to claim 9, wherein each of said recesses has a generally L-shaped cross section.

13. A duct assembly according to claim 12, wherein said coupling member has a pair of legs, each having a generally L-shaped cross section.

14. A duct assembly according to claim 13, wherein said coupling member has a generally cross-shaped cross-section.

15. A duct assembly according to claim 9 wherein adjacent abutment means on said bases and covers include an elongated rib having at least one coupling surface and an elongated socket having at least one coupling surface engageable with said coupling surface of said elongated rib for coupling said covers to said bases in said first coupled position to form said recesses therebetween.

16. A duct assembly according to claim 15, wherein said rubs are coupled to said side walls and said sockets are coupled to said end portions.

17. A duct assembly according to claim 15, wherein each of said ribs and said sockets further includes a second coupling surface for coupling said covers to said bases in said second coupled position.

18. A duct assembly according to claim 15, wherein each of said recesses has a generally L-shaped cross section, and said coupling member has a generally cross-shaped cross-section with a pair of legs having a generally L-shaped cross-section adaptable to be coupled within said L-shaped recesses formed in said first and second ducts.

* * * * *